2,985,618
METHOD FOR ADDING STABILIZER TO HALOGENATED POLYMER

Merlan Meredith Lambert, Baton Rouge, La., and Francis P. Baldwin, Colonia, N.J., assignors to Esso Research and Engineering Company, a corporation of Delaware No Drawing. Filed Jan. 24, 1958, Ser. No. 710,845

6 Claims. (Cl. 260—45.8)

This invention relates to the recovery of halogenated butyl rubber in the presence of solutions of certain organic aromatic, or heterocyclic stabilizers.

Butyl rubber copolymers comprise a major proportion (preferably about 85 to 99.5 weight percent of a $C_4$ to $C_8$ isoolefin such as isobutylene, 2-methyl-1-butene or 3-methyl-1-butene, etc., with a minor proportion (preferably about 15 to 0.5 weight percent) of a multiolefin of about 4 to 14, preferably about 4 to 6 carbon atoms and are commonly referred to in patents and technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, myrcene, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc. Such a copolymer has a Staudinger molecular weight between about 20,000 and 300,000, and a mole percent unsaturation between about 0.5 and 15.0.

Halogenated rubbery isoolefin-multiolefin copolymers such as halogenated butyl rubbers are produced by carefully chlorinating or brominating these copolymers in a manner which does not substantially degrade the molecular weight thereof. More particularly, in producing halogenated butyl rubber, the halogenation is regulated so that the resulting rubber will contain at least about 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent combined halogen but not more than about 3 atoms of halogen per double bond in the copolymer.

Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloro-aceto-acetanilide, N,N' - dichloro - 5,5 - dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chlorohydantoins, bromo-hydantoins, iodine monochloride, and related materials.

The halogenation is generally conducted at temperatures of above about 0° to about +150° C., preferably about 20° to 70° C., depending upon the particular halogenating agent, solvent used and processing pressure, for about one minute to several hours. An advantageous pressure range is from about 0.1 to 1000 p.s.i.a., atmospheric pressure being satisfactory The halogenation may be accomplished by preparing a 1 to 80 weight percent solution of such copolymers as above, in a relatively inert $C_5$ to $C_{10}$ aliphatic hydrocarbon such as pentane, hexane, heptene, cyclohexane, mixed $C_5$ to $C_{10}$ paraffins, mixed $C_5$ to $C_{10}$ naphthenes and mixtures thereof. Such aliphatic hydrocarbons have been found to be better solvents for butyl rubber than such materials as aromatics, mixtures of aromatics with alcohols or ketones or mixtures of aliphatic hydrocarbons with alcohols and ketones. Furthermore, such $C_5$ to $C_{10}$ aliphatic hydrocarbons are less expensive than these last mentioned materials.

The halogenated butyl rubber formed as above is then conventionally washed to remove residual hydrogen halide acids and unreacted halogens or halogen compounds at temperatures of between about 10° and 100° C. under 0 to 1,000 p.s.i.g. pressure for several seconds under conditions of good agitation or up to 1 hour or more without agitation. The halogenated butyl rubber is conventionally washed with sufficient amounts of water to remove the residual hydrogen halide acids and the water may contain the stoichiometric quantities based on hydrogen halide acids of alkaline materials such as potassium hydroxide, sodium hydroxide, potassium carbonate, sodium carbonate, sodium bicarbonate, organic amines, etc. Alternatively, the alkaline materials may be partially or completely replaced by materials capable of reacting with free halogens, such a material being, for example sodium bisulfite.

This water washed halogenated butyl rubber solution is then conventionally injected into a vessel containing steam and/or agitated water heated to a temperature sufficient to volatilize the solvent and form an aqueous slurry of the halogenated butyl rubber. The halogenated butyl rubber may then be separated from the slurry by filtration and drying and recovered as a "crumb" or as a dense sheet or slab by conventionally hot milling and/or extruding procedures. As so produced, the halogenated rubbery copolymer has a Staudinger molecular weight within the range of approximately 20,000 to 300,000, preferably about 25,000 to 200,000, and a mole percent unsaturation of about 0.5 to 15.0.

It is known that various stabilizers may be added per se or as a slurry to the halogenated butyl rubber crumb during the slurrying stage (i.e., in the slurry vessel) of the process where the halogenated butyl rubber is recovered from the hydrocarbon solution. Such stabilizers, which are preferably organic, aromatic or heterocyclic type stabilizers, are employed in amounts of between about 0.05 to 10 weight percent, preferably about 0.1 to 5.0 weight percent based on halogenated butyl rubber. Such organic stabilizers are conventionally blended at temperatures of between about 10° and 100° C. after the washing step. However, considerable difficulty has been encountered in obtaining a homogeneous distribution of stabilizer in the halogenated butyl rubber crumb when such stabilizers (which are generally insoluble in water) are employed in this manner. However, these organic aromatic or heterocyclic stabilizers are among the most effective in stabilizing halogenated butyl rubber.

In accordance with the present invention, a solution of an organic aromatic or heterocyclic stabilizer is added to the halogenated butyl rubber solution after washing but prior to the slurrying stage (i.e. before introduction into the slurry vessel). By means of this procedure homogeneous halogenated butyl rubber crumbs are obtained upon subsequent slurrying, filtering and drying. The organic aromatic or heterocyclic stabilizer generally is added as a 1 to 60 weight percent solution and preferably has a 5 to 50 weight percent solution in one or more of the stabilizer solvents enumerated hereinafter.

For the purposes of the present invention, the stabilizer solvents are selected from the group consisting of the following which may be used alone or in admixture with one another:

(a) $C_5$ to $C_{10}$ aliphatic hydrocarbons such as pentane, hexane, isooctane, mineral spirits, etc.

(b) $C_6$ to $C_{10}$ aromatic hydrocarbons of the general formula:

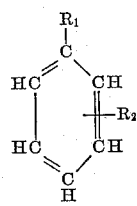

in which $R_1$ and $R_2$ are selected from the group consisting of hydrogen, methyl, ethyl, propyl, isopropyl, butyl, isobutyl, and tertiary butyl in either the ortho, meta, or para positions, and mixtures thereof. The preferred aromatic solvents are benzene, toluene, and xylenes;

(c) Mixtures of $C_5$ to $C_{10}$ aliphatic hydrocarbons and $C_6$ to $C_{10}$ aromatic hydrocarbons, such as the following petroleum hydrocarbon fraction or its equivalent:

| Component | Volume Percent | |
|---|---|---|
| | General Range | Typical Fraction |
| 2,2-dimethyl butane | 0–5.0 | 0.10 |
| 2,3-dimethyl butane | 0–15 | 2.40 |
| 2-methyl pentane | 1–30 | 10.75 |
| 3-methyl pentane | 2–35 | 12.45 |
| n-hexane | 10–70 | 44.85 |
| methyl cyclopentane | 5–50 | 20.50 |
| 2,2-dimethyl pentane | 0–10 | 0.40 |
| benzene | 0.5–20 | 7.70 |
| cyclohexane | 0–10 | 0.85 |

(d) Admixtures of a major proportion of such $C_6$ to $C_{10}$ aromatic hydrocarbons as above with minor proportions, insufficient to precipitate the halogenated butyl rubber, generally about 0.5 to 30 weight percent based on total solvent of $C_3$ to $C_8$ alcohols and/or $C_3$ to $C_8$ ketones or mixtures thereof such as isopropyl alcohol, n-butyl alcohol, secondary butyl alcohol, isobutyl alcohol, mixed $C_6$ alcohols such as prepared by the carbonylation of $C_5$ mixed olefins, acetone, methyl ethyl ketone, diethyl ketone, methyl propyl ketone, cyclohexanone, etc. In this case, it is preferred that the alcohols, or ketones comprise approximately 3 to 20 weight percent of the total stabilizer solvent;

(e) Admixtures of a major proportion of a $C_5$ to $C_{10}$ aliphatic hydrocarbon with a minor proportion, insufficient to precipitate the halogenated butyl rubber, preferably about 0.5 to 30 weight percent based on total solvent of $C_3$ to $C_8$ alcohols and/or ketones and/or mixtures thereof.

The organic stabilizing compounds employed in accordance with the present invention may have boiling points between about 100° and 700° C. and are chosen from the four categories enumerated hereinafter, the members of all of which may be used singly or in combination:

(I) Aromatic or heterocyclic compounds containing at least one (preferably 1 to 5) hydroxyl radical and at least one (preferably 1 to 8) substituent selected from the group consisting of alkyl, alkaryl, aryl, aralkyl, cycloalkyl, alkoxy, aryloxy, aroyl, acyl, acyloxy and mixtures thereof, said substituent containing between about 1 and 24, preferably 1 to 18 carbon atoms. The total number of carbon atoms present in such compounds is generally between about 7 and 60, advantageously 7 to 48, preferably 8 to 42. Typical compounds falling within this category include 2,6-ditertiary butyl-4-methyl phenol; 2,2'-methylene-bis (4-methyl-6-tertiary butyl phenol); p-phenylphenol; p-hydroxyl-N-phenyl morpholine; hydroquinone monobenzyl ether; etc.

(II) Aromatic or heterocyclic amines such as substituted or unsubstituted mono or poly secondary amines having 1 to 5 nitrogen atoms and containing attached to at least one nitrogen and/or carbon atom at least one (preferably 1 to 8) substituent having about 1 to 24, preferably about 1 to 18 carbon atoms; the substituents and total number of carbon atoms present in such compounds being as set forth for the compounds of category (I). Typical compounds falling within category (II) include phenyl-beta-naphthylamine; N,N' - diphenyl-p-phenylene diamine; N,N'-dioctyl-p-phenylene diamine; heptylated diphenylamine; diphenyl ethylene diamine; p,p'-diamino diphenyl methane; N-N'-di-beta-naphthyl-p-phenylene diamine; 4,4'-dimethoxy diphenylamine; di-ortho tolyl ethylene diamine; etc.

(III) Aromatic or heterocyclic compounds containing at least one (preferably 1 to 5) hydroxyl group and at least one primary (or preferably secondary) amino group, said compounds preferably having about 1 to 5 nitrogen atoms and containing attached to at least one nitrogen and/or carbon atom at least one (preferably 1 to 8) substituent having about 1 to 24, preferably about 1 to 18 carbon atoms; the substituents and total number of carbon atoms present in such compounds being as set forth for the compounds of category (I). Typical compounds falling within category (III) include N-lauroyl-p-aminophenol; N-stearoyl-p-aminophenol; N-dodecanoyl-1-hydroxy-4-aminonaphthalene; N-hexanoyl-2-amino-4-n-octyl phenol; etc.

(IV) Reaction products of the compounds of category (I) and/or unsubstituted hydroxy-aromatics such as phenol, naphthol, bisphenols and xylenols and/or unsubstituted hydroxy-heterocyclics such as pyridine, quinoline or the like and/or the compounds of category (III), with aldehydes and/or ketones having about 1 to 20, preferably about 1 to 8 carbon atoms. Typical compounds falling within category (IV) include 2,2'-methylene-bis (4-methyl-6-tertiary butyl phenol); aldol-alpha-naphthylamine reaction products; reaction products of a diphenylamine and acetone; diarylamine-ketones; reaction product of acetone and p-aminodiphenyl; aniline-acetaldehyde reaction products, etc.

In order to more fully illustrate the present invention, the following example is given.

*Example*

A run is made chlorinating butyl rubber having a Mooney viscosity (8 minutes at 212° F.) of 71, a mole percent unsaturation of 1.47, and a viscosity average molecular weight of 420,000.

A 15 weight percent solution in n-hexane of the above uncured butyl rubber is chlorinated in a 50-gallon glass lined Pfaudler reactor equipped with an agitator and baffle. Gaseous chlorine is continuously added to the butyl rubber solution over a period of 10 minutes at 30° C. and under atmospheric pressure. The chlorine is added to the reactor through a ⅜" stainless steel tube, one end of which is immersed below the liquid level of the agitated butyl rubber solution. The resulting solution of chlorinated butyl rubber is then water washed three times to remove dissolved hydrogen chloride. There is then added to the water washed solution a 20 weight percent solution of the solid stabilizer 2,6-ditertiary butyl para-cresol dissolved in benzene.

The resulting water washed solution containing the solution of the organic stabilizer in accordance with the present invention is then recovered by subsequently injecting the same into an agitated aqueous solution containing a commercial wetting agent of the aliphatic polyoxyethylene ether type (Sterox AJ) in an amount of 64 cc. per 100 pounds of chlorinated butyl rubber as a dispersing aid and 1 pound of calcium stearate per 100 pounds of chlorinated butyl rubber; the hot agitated aqueous solution being employed in an amount of 500 gallons per 100 pounds of chlorinated butyl rubber. It was noted visually that the slurry obtained was very uniform and homogeneous when the temperature is regulated to 165° F. whereby to flash off the solvent and form an aqueous slurry of the chlorinated butyl rubber in water.

This slurry is then filtered and the chlorinated butyl rubber then recovered in the form of a wet "crumb." It is visually noted that the crumb is more homogeneous than obtainable by other known recovery procedures. The crumb is then placed in a tray drier maintained at 210° F. and dried for 6 hours with a subsequent hot milling at a roll temperature of 250° F. for 8 minutes on a conventional rubber mill. The chlorinated butyl rubber thus produced in accordance with the present invention is not only homogeneous but also exhibits excellent heat aging stability when placed in a circulating air oven having a temperature of 157° C. and aged for 67 hours. After this thermal aging, the swell at 25° C. in cyclohexane is also approximately the same as that for the unaged chlorinated butyl rubber.

When the solid stabilizer 2,6-ditertiary butyl paracresol is added as a slurry to the slurry vessel, it is noted that the stabilizer is essentially entrained on the surfaces of the halogenated butyl rubber slurry particles and is not homogeneously distributed throughout the halogenated butyl rubber. Moreover, the exact amount of stabilizer thus entrained will be dependent on the exact nature of the polymer slurry particles formed. This results in poor control of stabilizer level.

Resort may be had to modifications and variations of the foregoing disclosed specific example without departing from the spirit of the invention or the scope of the appended claims.

What I claim is:

1. An improved method for incorporating a stabilizer into a halogenated rubbery isoolefin-multiolefin copolymer which comprises providing a solution of a halogenated rubbery isoolefin-multiolefin copolymer having a mole percent unsaturation of about 0.5 to 15.0 and containing about 0.5 wt. percent, but not more than about three atoms of combined halogen per double bond in said copolymer, said halogenated copolymer being in a $C_5$ to $C_{10}$ hydrocarbon solvent and adding to said solution a $C_5$ to $C_{10}$ hydrocarbon solvent containing about 0.05 to 18.0 wt. percent based on copolymer of a stabilizer for said copolymer.

2. A process according to claim 1 in which the stabilizer is 2,6-di-tertiary butyl-4-methyl phenol.

3. Process according to claim 2 in which the isoolefin-multiolefin copolymer is an isobutylene-isoprene copolymer.

4. A process according to claim 1 in which the organic stabilizing compound is added as a 1 to 60 weight percent solution in a solvent comprising a $C_6$ to $C_{10}$ aromatic hydrocarbon of the general formula:

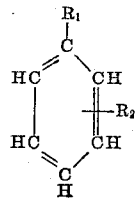

in which $R_1$ and $R_2$ are selected from the group consisting of hydrogen, methyl, ethyl, propyl, isopropyl, butyl, isobutyl, tertiary butyl, and mixtures thereof.

5. A process according to claim 1 in which the organic stabilizing compound is added as a 1 to 60 weight percent solution in a solvent comprising a major proportion of a $C_6$ to $C_{10}$ aromatic hydrocarbon as defined in claim 4 and a minor proportion of a member selected from the group consisting of $C_5$ to $C_{10}$ aliphatic hydrocarbons, $C_3$ to $C_8$ alcohols, $C_3$ to $C_8$ ketones, and mixtures thereof.

6. A process according to claim 1 in which the organic stabilizing compound is added as a 1 to 60 weight percent solution in a solvent comprising an admixture of a major proportion of $C_5$ to $C_{10}$ aliphatic hydrocarbon and about 5 to 30 weight percent based on total solvent of a member selected from the group consisting of $C_3$ to $C_8$ alcohols, $C_3$ to $C_8$ ketones, and mixtures thereof.

References Cited in the file of this patent

UNITED STATES PATENTS

| | | |
|---|---|---|
| 2,698,041 | Morrissey et al. | Dec. 28, 1954 |
| 2,868,764 | Hirsty | Jan. 12, 1959 |